United States Patent [19]
Daniel et al.

[11] 4,280,719
[45] Jul. 28, 1981

[54] CONNECTOR WITH ROTATABLE LOCKING RING, PARTICULARLY FOR A RISER USED IN OFFSHORE OIL EXPLORATION AND PRODUCTION

[75] Inventors: Edmond Daniel, Saulx-les-Chartreu; Jean Guesnon, Saint-Germain-en-Laye; André Laurencin, Lyons, all of France

[73] Assignee: Institut Francais du Petrole, Rueil-Malmaison, France

[21] Appl. No.: 63,659

[22] Filed: Aug. 3, 1979

[30] Foreign Application Priority Data

Aug. 3, 1978 [FR] France .............................. 78 23209

[51] Int. Cl.³ .......................................... F16L 39/00
[52] U.S. Cl. ................................. 285/90; 285/137 A; 285/377
[58] Field of Search .................. 285/137 A, 362, 377, 285/360, 361, 376, 90, 91

[56] References Cited

U.S. PATENT DOCUMENTS

| | | | |
|---|---|---|---|
| 4,043,575 | 8/1977 | Roth | 285/377 X |
| 4,068,865 | 1/1978 | Shanks | 285/90 |
| 4,097,069 | 6/1978 | Morrill | 285/362 X |

*Primary Examiner*—Thomas F. Callaghan
*Attorney, Agent, or Firm*—Millen & White

[57] ABSTRACT

A connector including two interfitting tubular elements and a locking ring having at least two staggered rows of locking lugs cooperating with corresponding locking lugs of one of the tubular elements. The locking lugs are inscribed in cylindrical surfaces having different radii, so that when the ring is inserted on the element, its lugs slide effortless on the lugs of the first lug row of the element to a position where the lugs of each lug row of the ring can pass between those of a corresponding row of the element to form a plurality of bayonet couplings which can then be simultaneously locked.

11 Claims, 15 Drawing Figures

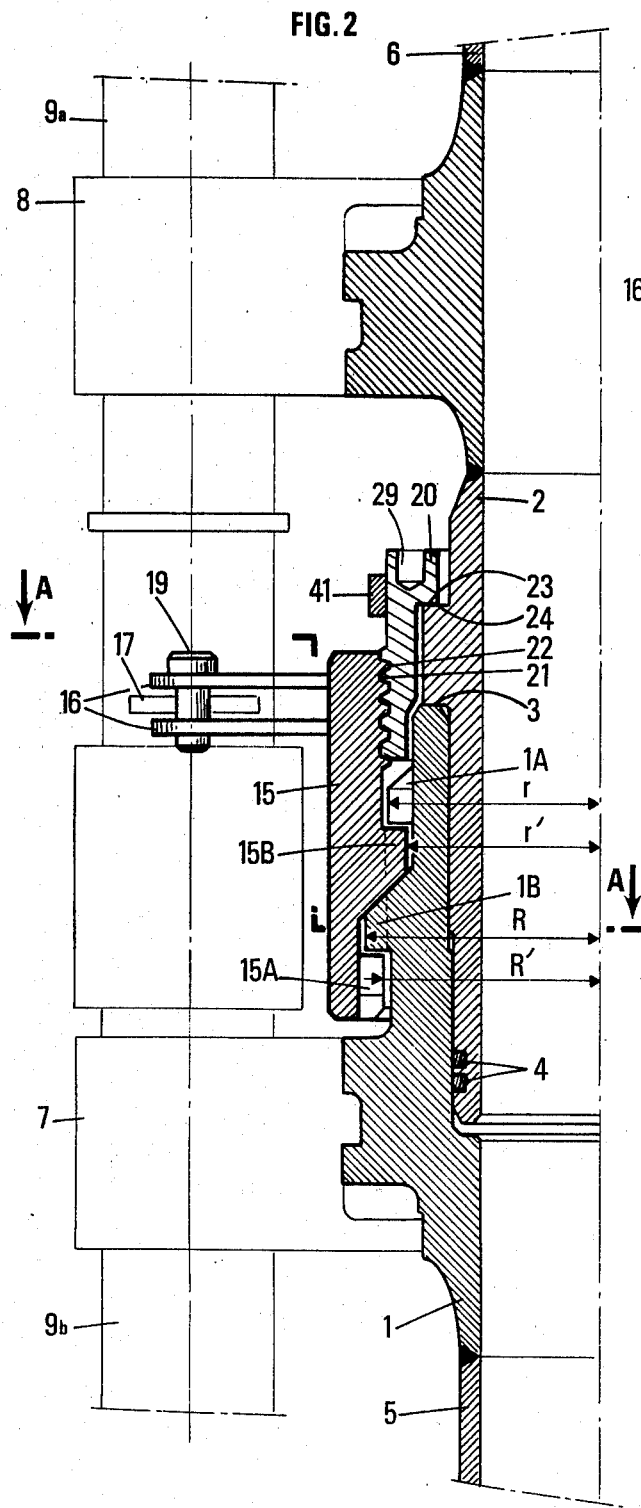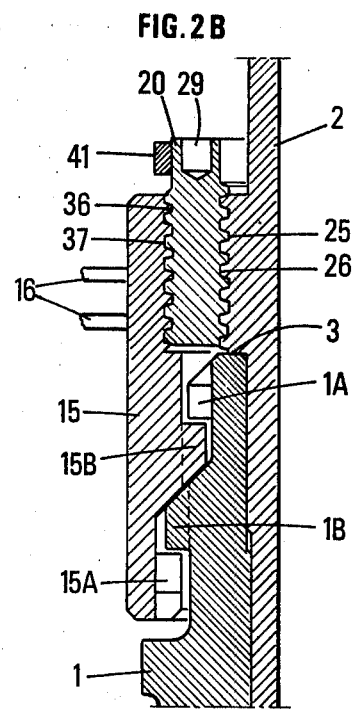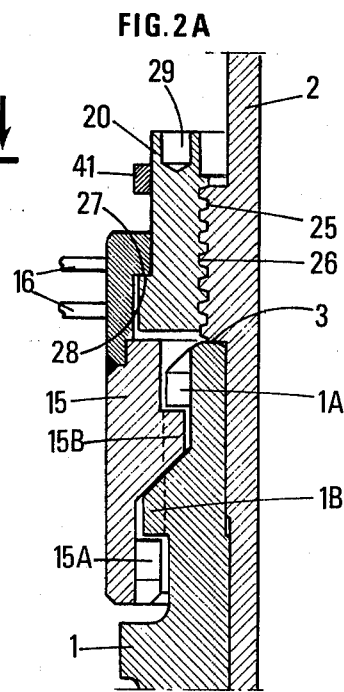

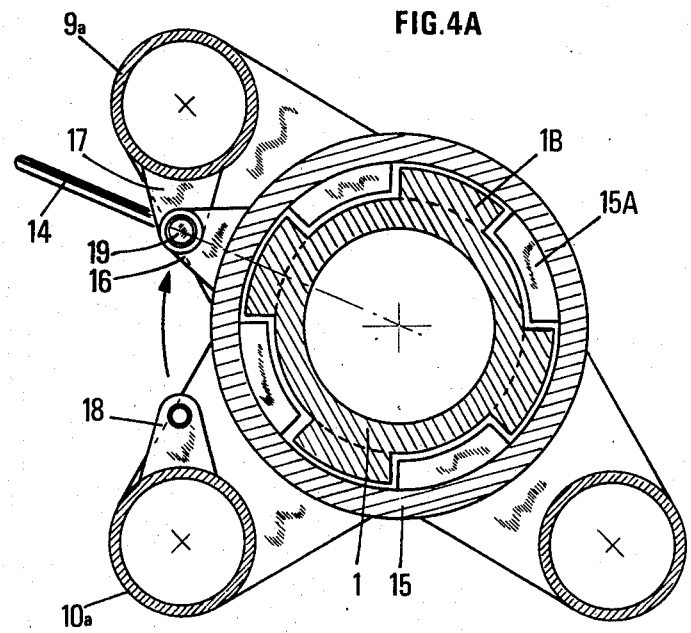
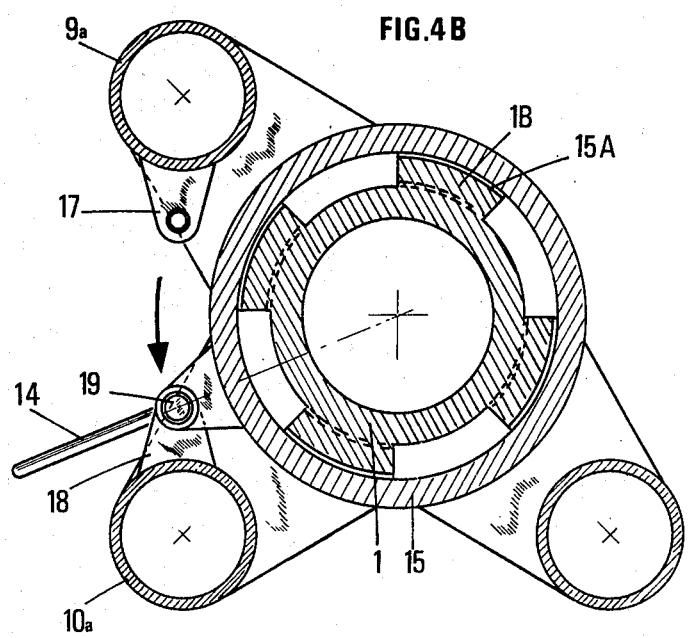

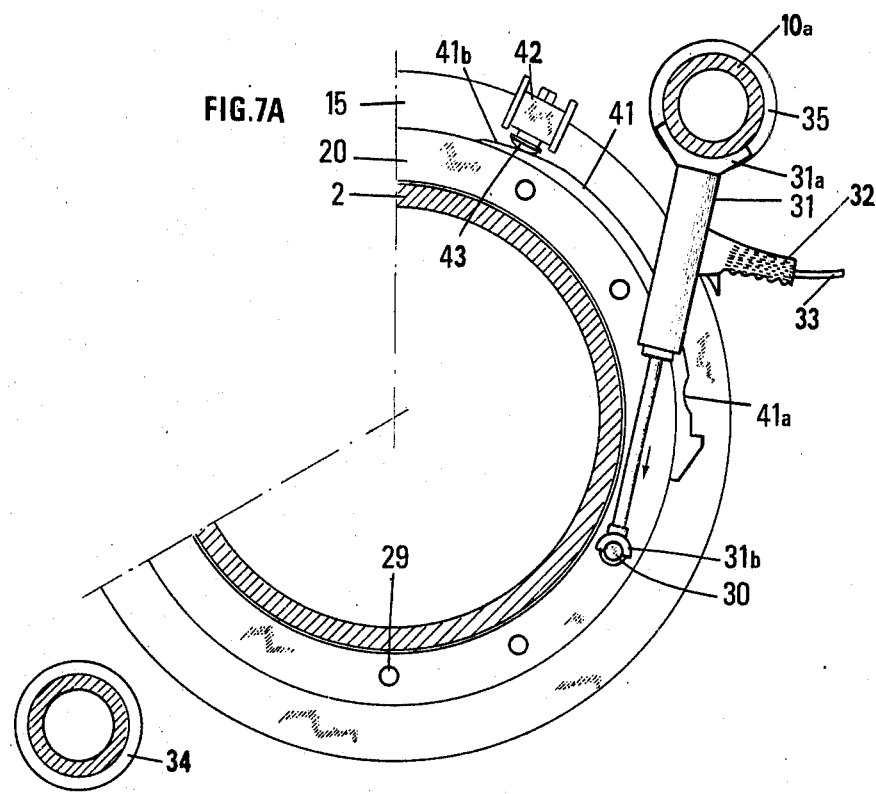
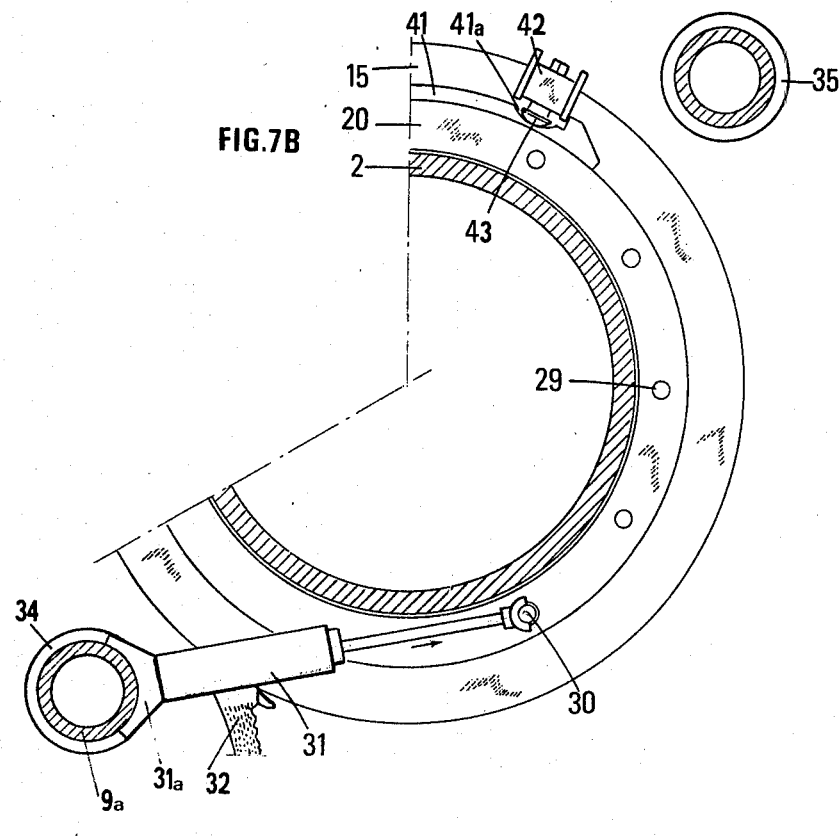

CONNECTOR WITH ROTATABLE LOCKING RING, PARTICULARLY FOR A RISER USED IN OFFSHORE OIL EXPLORATION AND PRODUCTION

BACKGROUND OF THE INVENTION

The present invention relates to a connector with a rotatable locking ring, particularly for a riser used in offshore oil exploration or production.

The invention will be described with special reference to the described application, which is not limitative, although the connector according to the invention is particularly adapted to solve the connection problems in such a riser.

The most frequently used connectors in this field are of the radially gripping type and their major disadvantage is that they develop very high radial stresses and which result in a poor distribution of the vertical load along the periphery of the connector.

Prior art connectors having a rotatable ring include interlocking tubular elements having an axial abutment, a locking ring inserted in a first tubular element to form therewith a bayonet coupling wherein locking lugs of the ring cooperate with corresponding lugs of the first tubular element, and means bearing on the second tubular element for applying through the lugs of said locking ring, an axial prestress urging the tubular elements against each other.

Connectors of this type, for example, disclosed in French Patent Specification Nos. 2,249,280 and 2,322,323, suffer from a number of drawbacks due to the fact, in particular, that the connection of the two tubular elements is achieved with an angular contact interval between the lugs which is, by construction, smaller than 180°, about the connector axis. Consequently the distribution of the axial stresses about this axis is not sufficiently uniform.

Moreover, in these prior art connectors any increase in the prestress urging the two tubular elements against each other results in a corresponding reduction of the above-defined contact angular interval.

The first of these drawbacks can be eliminated by constructing a connector with rotatable ring wherein the first tubular element and the locking ring are each have at least two crowns of lugs which are angularly staggered from one crown to the other.

This provides a connector wherein the lugs of the first tubular element and those of the locking ring contact each other over a much greater angular interval than that obtainable with conventional bayonet connectors.

This angular interval may be close to 350° when the first tubular element of the connector and the locking ring are each provided with only two lug rows (this number being by no way limitative), which provides for a perfect distribution of the axial stresses applied to the connector.

French Patent Specification No. 1,301,318 (Guyot) shows such a pipe coupling provided with locking lugs distributed in alternate rows.

A first embodiment of this coupling suffers from the drawback of requiring a succession of axial displacements combined with a succession of rotations to achieve the connection. This requirement is not acceptable for use in the above-described application.

This drawback is reduced, in a second embodiment, by using rows of locking lugs of different thicknesses, the first row (from the coupling end) being crossed over by exerting an axial force between the two tubular elements of the coupling, thus causing a radial deformation of the wall of the coupling sleeve. This second embodiment requires the use of a sleeve of flexible or semi-flexible material which seems to be incompatible with the considered application.

SUMMARY OF THE INVENTION

The present invention eliminates the drawbacks of the prior art coupling by providing a connector having at least two rows of angularly staggered locking lugs which are inscribed in cylindrical surfaces of different radii, so that in the interlocking position of the locking ring with the first tubular element, their locking rings can slide effortless on each other up to a position where the lugs of each row of the locking ring are engaged between the lugs of a corresponding lug row of the first tubular element to make up a plurality of bayonet couplings with simultaneous locking.

According to a preferred embodiment of the invention, the above described second drawback is also eliminated by using clamping means separate from the locking ring. This permits adjustment of the prestress without changing the overall value of the angular contact interval of the lugs.

BRIEF DESCRIPTION OF THE DRAWINGS

Embodiments of the invention are illustrated in the accompanying drawings wherein:

FIG. 2 is a partial view of the connector elements in axial section, in the unlocked position of this connector, FIG. 2A shows a first modification of the embodiment of FIGS. 1 and 2, FIG. 2B illustrates a second modification, FIGS. 4A and 4B are two cross-sections of the connector of FIG. 2, along line AA of this figure and illustrate the locking of the connector.

FIGS. 6 and 7A illustrate, in longitudinal section and top section, respectively, how the connector is tightened, FIG. 7B shows how it is released.

DETAILED DESCRIPTION OF THE PREFERRED EMBODIMENT

Figure 1:
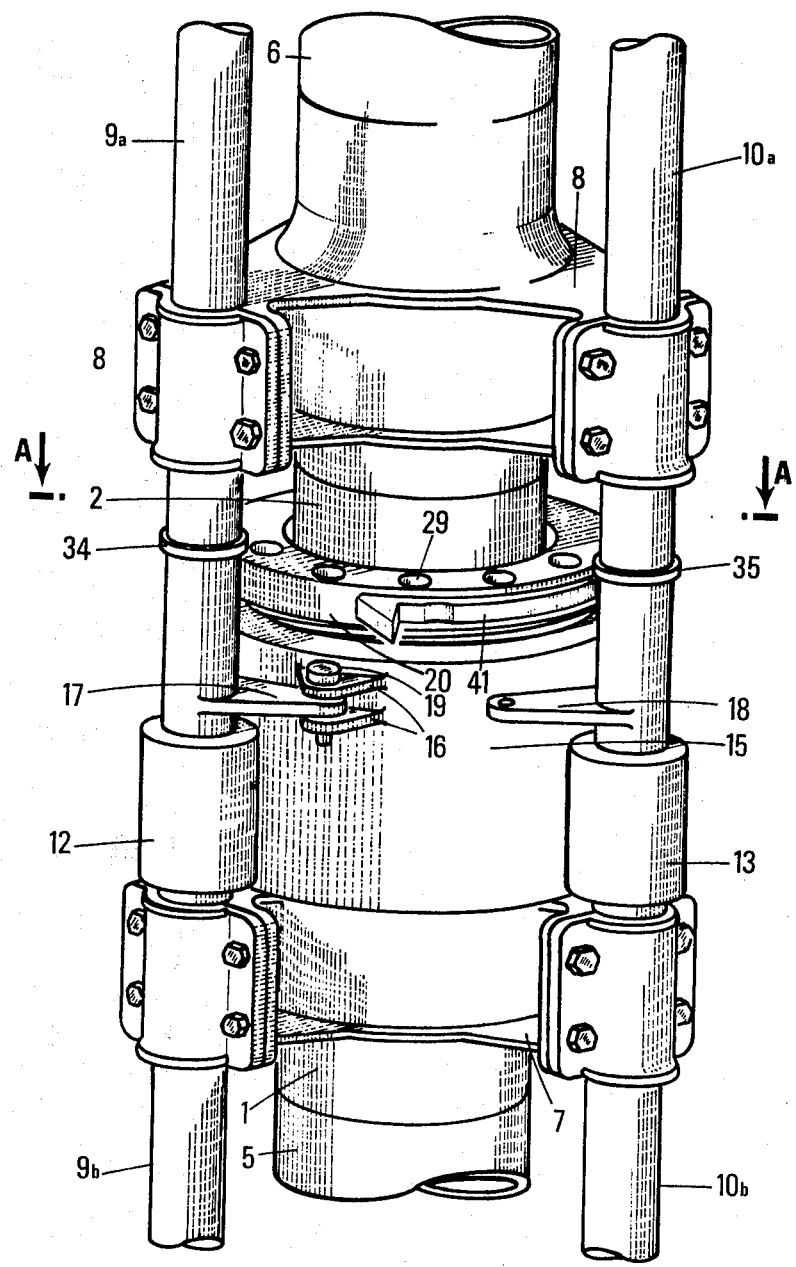
FIG. 1 is an overall perspective view of a connector according to the invention for use in an offshore drilling riser.

In the drawings showing an embodiment of the connector according to the invention for a riser used in offshore oil exploration or production, references 1 and 2 respectively designate a first and a second tubular interlocking element of the connector, such interlocking being limited by an axial abutment or shoulder 3 and sealing being achieved by gaskets 4 (FIG. 2). Reference 5 designates an element of the lower part of the riser and reference 6 an element of the upper part of this riser. Elements 5 and 6 are secured respectively to elements 1 and 2 of the connector through any suitable means, such as by welding.

References 7 and 8 designate flanges for respectively securing to the lower and upper parts of the riser, additional lines, such as the so-called kill line, choke line and booster line which conventionally equip risers used in the oil industry.

These lines are formed of sections such as 9a, 9b, 10a and, 10b which fit into sleeves 12 and 13 at the level of the connector. The latter comprises a locking ring 15 surrounding the ends of elements 1 and 2 in their fitting position.

Locking and unlocking of the connector is effected by rotating the ring 15 over a fraction of a revolution (bayonet type locking).

This rotation may be effected, for example, by using a handling rod 14 (FIGS. 4A and 4B).

The locking ring 15 comprises a shell 16 which at will may be connected, through a pin 19, either to a bracket 17 which is integral with a line portion 9a (unlocking or released position shown in FIG. 1), or to a bracket 18 which is integral with line portion 10a (locking position).

The connector also includes a tightening ring 20, which, in the embodiment of FIG. 2, can be screwed on the locking ring 15 (threadings 21 and 22) and comes to bear, through an annular abutment 23, on an annular collar 24 of element 2 to apply an axial prestress urging the tubular elements 1 and 2 against each other, when ring 15 is in locking position.

In the embodiment shown in FIG. 2A, the tightening ring 20 is screwed on tubular element 2 (threading 25 and 26). Moreover two annular shoulders 27 and 28 interlock ring 15 and ring 20.

FIG. 2B illustrates another embodiment wherein the tightening ring 20 is screwed both to the locking ring 15 and to the tubular element 2, the connection to ring 15 being achieved through threads 36 and 37 having different or opposite pitches from that of the threaded pair 25 and 26.

The embodiments shown in FIGS. 2A and 2B offer the advantage of permitting uncoupling of the ring 20.

In the connector according to the invention, the tubular element 1 and the locking ring 15 each have the same number of lug rows, this number being at least equal to two.

Figure 3A:
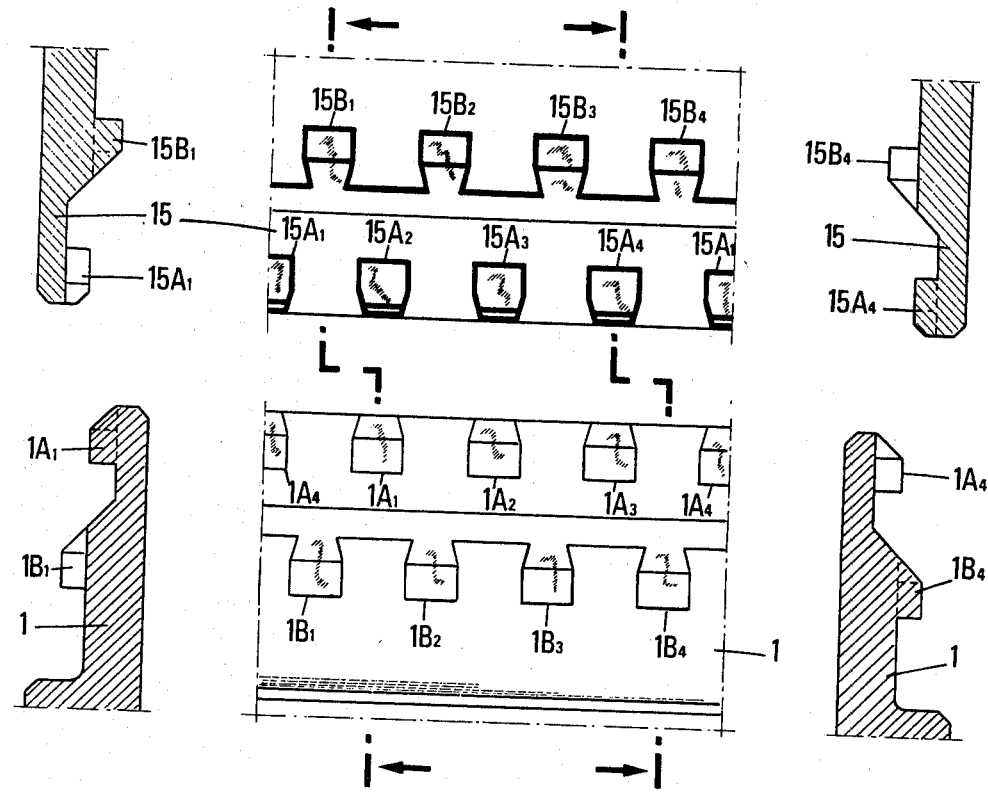
FIGS. 3A and 3B are a developed view and a longitudinal cross-sectional view showing the engagement and the interlocking of the connector elements.

In the illustrated embodiment, element 1 and ring 15 each include a first and a second row of interlocking lugs, when starting from the fitting ends: a first row formed of locking lugs $1A_1$, $1A_2$ . . . and a second row formed of lugs $1B_1$, $1B_2$. . . , for tubular element 1; a first row formed of lugs $15A_1$, $15A_2$ . . . and a second row formed of lugs $15B_1$, $15B_2$ . . . , for the locking ring 15 (FIG. 3A).

Figure 5A:
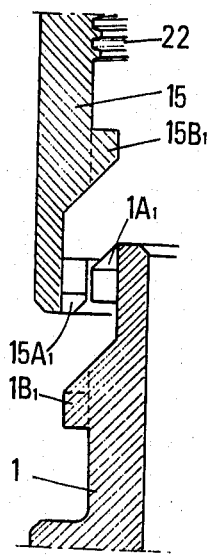
FIGS. 5A to 5D show in longitudinal cross-section the four successive phases of the connection of the connector elements.

These locking lugs are angularly staggered from one row to the other and inscribed in cylindrical surfaces of different radii (r and R for the first and second lug rows of tubular element 1, R' and r' for the first and second lug rows of locking ring 15, FIG. 2). The radius R' is slightly greater than the radius r, so that lugs $15A_1$, $15A_2$ . . . of the first lug row of locking ring 15 can slide freely and optionally freely rotate on lugs $1A_1$, $1A_2$ . . . of the first lug row of tubular element 1 (FIGS. 3A and 5A).

Moreover, lugs $15A_1$, $15A_2$ . . . $15A$ . . . of the first lug row of the locking ring 15 co-operate with lugs $1B_1$, $1B_2$ . . . $1B$ . . . of the second lug row of element 1 to form a first bayonet assembly and lugs $15B_1$, $15B_2$ . . . $15B$ . . . of the second lug row of the locking ring 15 co-operate with lugs $1A_1$, $1A_2$ . . . $1A$ . . . of the first lug row of element 1 to form a second bayonet assembly.

Each of these two bayonet assemblies provides contact between the lugs of tubular element 1 and the lugs of locking ring 15 over an overall angular interval of about 175°. Since these two locking assemblies are angularly staggered about the connector axis, the illustrated embodiment of connector according to the invention provides for a distribution of the axial stresses about the connector axis over an angular interval of about 350°.

The insertion of the connector elements, and the steps of locking ring 15 and achieving prestressing by means of ring 20 are described below.

FIG. 3A shows, partly in developed view and partly in longitudinal cross-section the locking ring 15 and the tubular element 1 of the connector before this ring is positioned on this element.

Insertion of ring 15 is illustrated in FIG. 5A showing locking lugs $15A_1$, $15A_2$ . . . of the first lug row of the ring passing over those of the second lug row of element 1 (radius R' slightly greater than radius r, FIG. 2).

Figure 5B:
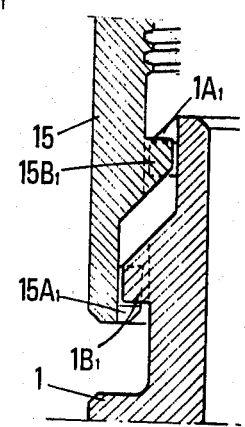

FIG. 5B shows how the lugs $15A_1$, $15A_2$ . . . of the first lug row of locking ring 15 can pass between the lugs $1B_1$, $1B_2$ . . . of the second lug row of tubular element 1 and how, simultaneously, lugs $15B_1$, $15B_2$ . . . of the second lug row of ring 15 can pass between the lugs $1A_1$, $1A_2$ . . . of the first lug row of tubular element 1, in the angular position of shell 16 illustrated in FIGS. 1, 2 and 4A.

Figure 5C:
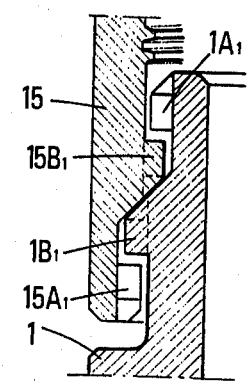
Figure 5D:
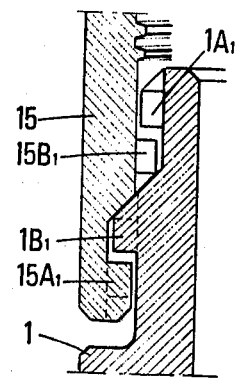

This operation is completed in the position illustrated by FIG. 5C and it is then sufficient to rotate ring 15 over a fraction of a revolution to reach the locking position illustrated in FIGS. 4B and 5D. This rotation of ring 15 up to the position of FIG. 4B may be effected by means of the rod 14 (FIG. 4B), the ring 15 being then secured in this locking position by means of pin 19, traversing the shell 16 of ring 15 and bracket 18 which is integral with the peripheral line 10a.

Figure 3B:
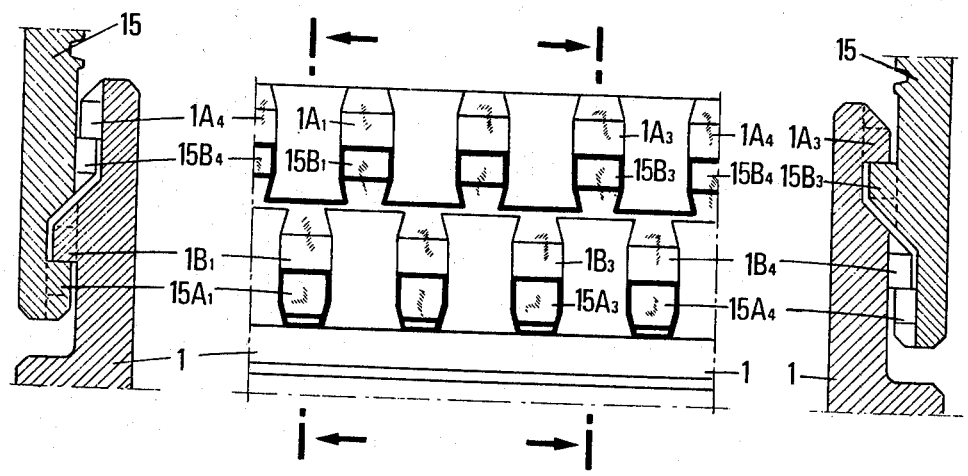
Figure 6:
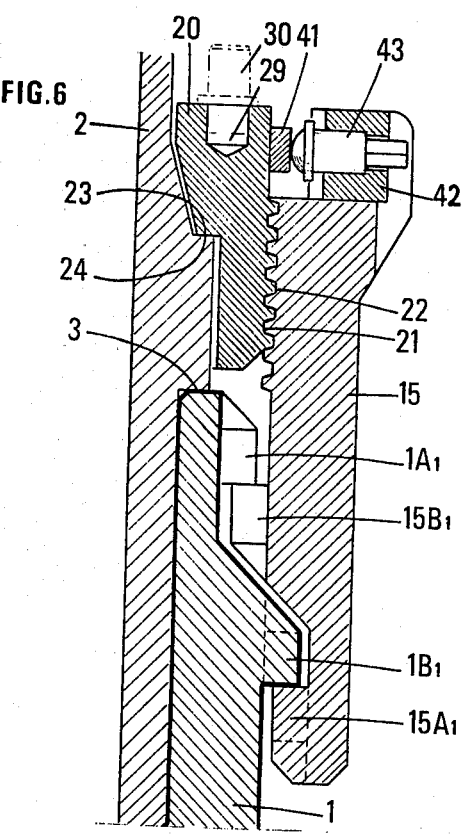

Tightening of ring 20 to place the locking lugs in the position illustrated in FIGS. 3B and 6 and locking of this ring in this position may be effected through any suitable means, an embodiment of such tightening and locking means being illustrated in FIG. 7A.

In this embodiment ring 20 has on the periphery of its upper wall a plurality of bores 29 into which removable pins 30 can be inserted (alternatively ring 20 may be provided with fixed pins). A jack 31, having one end 31a adapted to bear on peripheral line 10a through an annular shoulder 35 of this line, and having its other end 31b adapted to bear on a pin 30, makes it possible to screw the tightening ring 20 by rotating it in the direction indicated by the arrows in FIG. 7A. The jack 31, which, in the embodiment shown in FIG. 7A, is provided with a handle 32, is fed with pressurized fluid through pipe 33.

When ring 20 has been totally screwed on, this ring is in the position illustrated in FIG. 6, where the annular abutment 23 bears on collar 24 on the tubular element 2 to apply, in an axial direction, through the lugs of the locking ring 15 and those of tubular element 1, a prestress urging this element against element 2, elements 1 and 2 contacting each other at the level of collar 3.

Ring 20 is provided with means for locking it in the tightening position of ring 15, or in a released position, as defined below.

In the embodiment illustrated in FIGS. 6, 7A and 7B such means comprises a cam 41 integral with ring 20 and locking means carried by ring 15 and bearing on this cam, these locking means comprising a self-locking screw 43 passing through a support member 42.

In the tightening position of ring 20, screw 43 bears on ramp 41b of cam 41, thus preventing releasing of ring 20 relative to ring 15, the latter being held in position in the manner illustrated in FIG. 4A, by means of a pin 19 traversing the shell 16 and the bracket 17 which is integral with the peripheral line 9a.

In order to release ring 20, screw 43 is first unscrewed, then jack 31 is placed in the position shown in FIG. 7B, where this jack bears against the peripheral line 9a, its end 31a being then located on the annular shoulder 34 of this line.

Ring 20 is then released by actuating jack 31 in the direction indicated by the arrow into FIG. 7B to bring this ring in the position where the screw 43 can engage a recess 41a of cam 41.

The locking of ring 20 in this released position is then obtained by screwing the self-locking screw 43.

Uncoupling is then effected by a rotation of ring 15.

The axial prestress exerted by ring 20 may be achieved by tightening means other than those illustrated in FIGS. 7A and 7B. In particular, in the embodiments illustrated in FIGS. 2A and 2B this prestress may be obtained by means separate from ring 20 which will produce a prestress between element 2 and locking ring 15 of the desired value and will maintain this prestress temporarily. Ring 20 will then be screwed easily up to contact with the axial shoulder 24. It will then be sufficient to discontinue the action of the device which has produced the prestress of the desired value and this prestress will then be maintained by ring 20.

More generally the connector will comprise means for fastening the tightening ring 20 and the locking ring 15 to elements 1 and 2, an alternative embodiment of that shown in FIGS. 6, 7A and 7B consisting in securing directly the tightening ring 20 to the tubular element 2.

What is claimed is:

1. A connector with a rotatable locking ring comprising two interlocking tubular elements each having axial abutment means, a locking ring adapted for being inserted into a first of said tubular elements to form therewith a bayonet assembly said locking ring and said first tubular element having lugs wherein said lugs of said ring co-operate with corresponding lugs of said first tubular element, and means bearing on said second tubular element to exert in the axial direction, through said lugs of said locking ring, a prestress urging said tubular elements against each other, said lugs of said first tubular element and said lugs of said locking ring each comprising two lug rows angularly staggered with respect to each other, said lugs being inscribed in respective cylindrical surfaces of different radii, so that in the inserted position in said ring of said first tubular element, the respective lugs can slide effortlessly on one another up to a position where the lugs of each lug row of said locking ring pass between those of a corresponding row of said first tubular element to form a plurality of bayonet couplings which can be simultaneously locked.

2. A connector with a rotatable locking ring according to claim 1, wherein said means for applying said prestress is separate from said locking ring.

3. A connector according to claim 2, wherein said means for applying said prestress comprises a tightening ring.

4. A connector according to claim 3, wherein said tightening ring is connected through threads with said locking ring and said second tubular element having an annular shoulder with said locking ring bearing against said annular shoulder.

5. A connector according to claim 3, wherein said tightening ring is connected to said second tubular element through threads and comprises an annular shoulder engaging corresponding annular shoulder of said locking ring.

6. A connector according to claim 3, wherein said locking ring is connected to said first tubular element through first threads and to said second tubular element through second threads.

7. A connector according to claim 3, further comprising means for fastening the locking ring to said tubular elements in either of two positions comprising a locked and a released position of said locking ring.

8. A connector according to claim 7, adapted for use with a riser for offshore oil exploration or production, which is equipped with peripheral lines integral with said tubular elements, said connector comprising means for maintaining said locking ring in the locked position by connection of said locking ring to a first of said peripheral lines, and means for maintaining said locking ring in its released position by connection of said locking ring to a second of said peripheral lines.

9. A connector according to claim 8, comprising means for securing said tightening ring and said locking ring against movement relative to each other.

10. A connector according to claim 9, wherein said securing means comprises two elements which are respectively integral with said locking ring and with said tightening ring, one of said elements comprising a locking screw and the other a cam against which said locking screw can be tightened.

11. A connector according to claim 9 comprising means for fastening said tightening ring to said tubular elements.

* * * * *

UNITED STATES PATENT AND TRADEMARK OFFICE
CERTIFICATE OF CORRECTION

PATENT NO. : 4,280,719
DATED : July 28, 1981
INVENTOR(S) : EDMOND DANIEL ET AL

It is certified that error appears in the above—identified patent and that said Letters Patent is hereby corrected as shown below:

Column 6, line 25: reads "locking ring is connected to said first tubular element"

should read -- tightening ring is connected to said locking ring -- .

Signed and Sealed this

Thirteenth Day of April 1982

|SEAL|

Attest:

GERALD J. MOSSINGHOFF

Attesting Officer   Commissioner of Patents and Trademarks